United States Patent
Ben Fredj et al.

(10) Patent No.: US 9,819,752 B2
(45) Date of Patent: Nov. 14, 2017

(54) METHOD AND SYSTEM FOR DISCOVERY OF SERVICES IN INTERCONNECTED SMART SPACES

(71) Applicant: Alcatel Lucent, Boulogne Billancourt (FR)

(72) Inventors: Sameh Ben Fredj, Nozay (FR); Ludovic Noirie, Nozay (FR); Mathieu Boussard, Nozay (FR); Daniel Kofman, Saint Mande (FR)

(73) Assignee: Alcatel Lucent, Boulogne-Billancourt (FR)

( * ) Notice: Subject to any disclaimer, the term of this patent is extended or adjusted under 35 U.S.C. 154(b) by 38 days.

(21) Appl. No.: 14/891,735

(22) PCT Filed: May 15, 2014

(86) PCT No.: PCT/EP2014/060020
§ 371 (c)(1),
(2) Date: Nov. 17, 2015

(87) PCT Pub. No.: WO2014/184319
PCT Pub. Date: Nov. 20, 2014

(65) Prior Publication Data
US 2016/0119435 A1    Apr. 28, 2016

(30) Foreign Application Priority Data
May 17, 2013    (EP) ..................... 13305641

(51) Int. Cl.
*H04L 29/08* (2006.01)
(52) U.S. Cl.
CPC .................. *H04L 67/16* (2013.01)
(58) Field of Classification Search
CPC ...................................... H04L 67/16
See application file for complete search history.

(56) References Cited

U.S. PATENT DOCUMENTS

| 2007/0283002 A1* | 12/2007 | Bornhoevd | G06F 9/54 709/224 |
| 2008/0222068 A1* | 9/2008 | Bahl | G06N 5/043 706/46 |

(Continued)

OTHER PUBLICATIONS

Swaroop Kalasapur et al., "Seamless Service Composition (SeSCo) in Pervasive Environments," ACM, pp. 11-20, XP040030505, Nov. 11, 2005.

(Continued)

*Primary Examiner* — Ajay Cattungal
(74) *Attorney, Agent, or Firm* — Fay Sharpe, LLP

(57) ABSTRACT

The invention relates to a method for enabling the discovery of at least one service (24) matching a discovery request and provided by an object located in a space among interconnected smart spaces. The method comprises:—modelling the interconnected smart spaces in an n-level architecture (1) comprised of lowest-level nodes (2) representing spaces containing physical connected objects and upper-level nodes (3, 4),—at each lowest-level node (2): clustering services (24) associated with said physical connected objects into at least one lowest-level service cluster (22), aggregating parameters (26, 28) defining each cluster (22) into information aggregation, and sending (5) said information aggregation to parent nodes,—at each node (3, 4) from level 2 to n: clustering received information aggregation into at least one upper-level cluster (32, 42), aggregating parameters (36, 38) defining each cluster (32, 42) into local information aggregation, building a cluster matching table based on the local information aggregation and received information aggregation, and sending (50) said local information aggregation to parent nodes, if any, these steps being performed recursively within each node starting from level 2, and wherein upon reception at a processing parent node (3, 4) of the request for a service (24), processing the request to forward it level by (Continued)

level to child nodes upon successive matching of the request with the cluster matching table until the request reaches a target lowest-level node (2) representative of a space containing the object providing the service (24) matching the request.

9 Claims, 1 Drawing Sheet

(56) References Cited

U.S. PATENT DOCUMENTS

| | | | | |
|---|---|---|---|---|
| 2008/0222287 A1* | 9/2008 | Bahl | ............... | H04L 41/5058 709/224 |
| 2009/0006156 A1* | 1/2009 | Hunt | ............... | G06Q 30/02 705/7.11 |
| 2009/0158240 A1* | 6/2009 | Zhang | ............... | G06F 8/00 717/104 |
| 2010/0217837 A1* | 8/2010 | Ansari | ............... | G06Q 30/04 709/218 |
| 2012/0078727 A1* | 3/2012 | Lee | ............... | G06Q 30/02 705/14.66 |
| 2012/0084151 A1* | 4/2012 | Kozak | ............... | G06Q 30/02 705/14.58 |
| 2012/0084348 A1* | 4/2012 | Lee | ............... | G06Q 30/02 709/203 |
| 2012/0084349 A1* | 4/2012 | Lee | ............... | G06Q 30/02 709/203 |
| 2012/0109882 A1* | 5/2012 | Bouse | ............... | H04L 67/306 707/607 |
| 2012/0330869 A1* | 12/2012 | Durham | ............... | G06N 5/022 706/16 |

OTHER PUBLICATIONS

Sachin Bhardwaj et al., "Increasing Reliability and Availability in Smart Spaces: A Novel Architecture for Resource and Service Management," IEEE Transactions on Consumer Electronics, vol. 58, No. 3, pp. 787-793, XP011465092, 2012.

Ivan Marsa-Maestre et al., "Mobile Devices for Personal Smart Spaces," International Conference on Advanced Information Networking and Applications Workshops, IEEE, pp. 623-628, XP031334750, 2007.

International Search Report for PCT/EP2014/060020 dated Jul. 17, 2014.

* cited by examiner

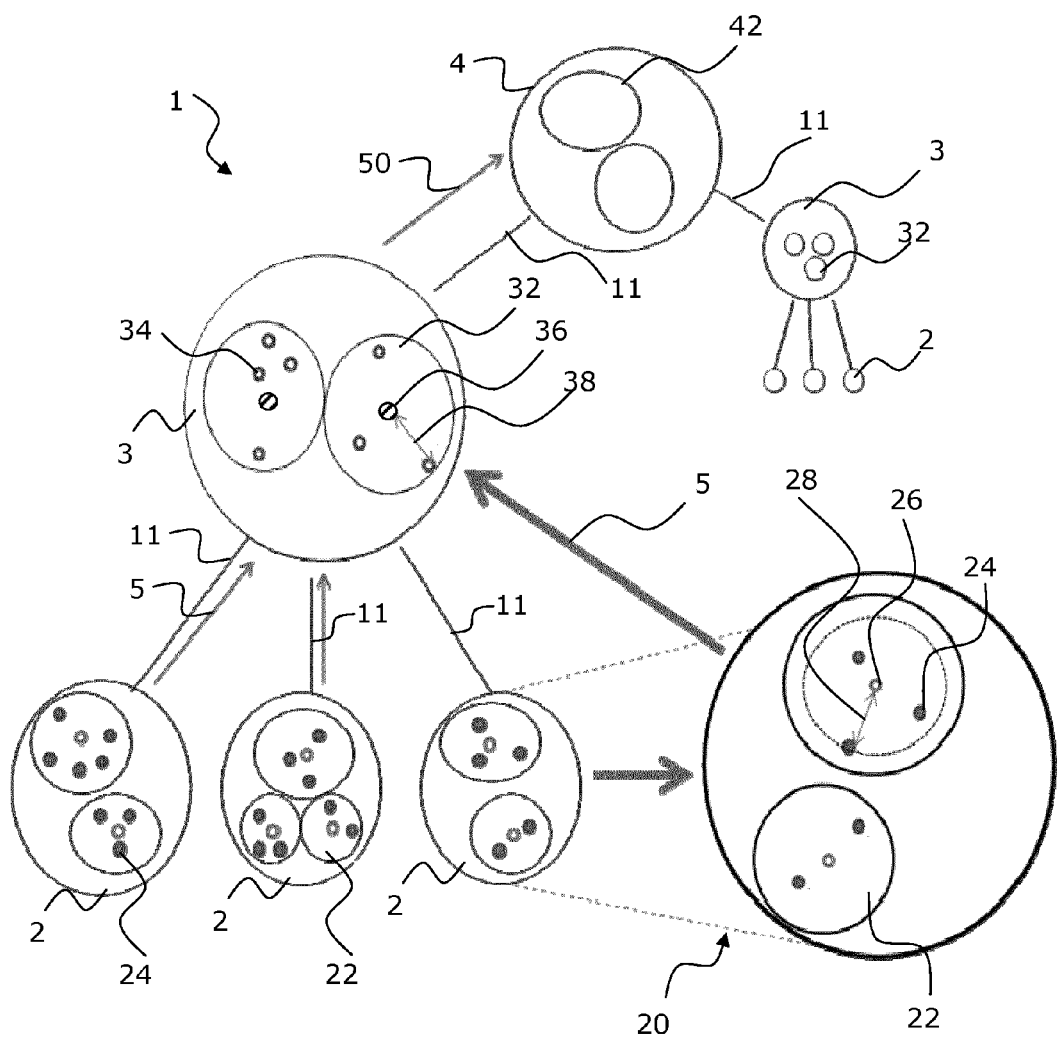

METHOD AND SYSTEM FOR DISCOVERY OF SERVICES IN INTERCONNECTED SMART SPACES

TECHNICAL FIELD

The present invention relates to the field of pervasive computing. More particularly, the invention concerns a method for enabling the discovery of at least one service provided by an object located in a space among interconnected smart spaces.

BACKGROUND

Smart space environments have become of interest in recent years, in particular in the context of pervasive computing, which has the objective of seamlessly embedding computing, or information processing, in everyday life. In particular in relation to the Internet of Things, a communication network, such as the internet, does not only link computers and terminals, but any kind of surrounding objects and their virtual representations, and implies various technologies such as wireless technologies, computer technologies, and electronic identification technologies. The linked objects may be identified by electronic labels, and connected to the internet via communication terminals, thus allowing for receiving, storing, processing, and transfer object-related data. Objects, interfaces, and computers or terminals linked within a smart space may be conceived to service specific user requirements. Smart spaces also feature communication means to connect the virtual representations of the objects within a system of interconnected smart spaces.

The objects may be located in physical or virtual spaces and are typically associated with services they provide. Examples for smart spaces and the contained objects include the following:

- an office or a company department, comprising telephones, computers, printers, video projectors, etc.,
- a hotel or a residence, including alarms, heaters, remote controls, televisions, labeled chairs, etc.,
- an airport, a shopping centre, or another public building, including computers or servers, sensors, etc.

In order to benefit from a service provided by an operated or otherwise used object, a service discovery request is launched in the smart space or in a plurality of interconnected smart spaces to discover services complying to the request, e.g. linked to the location of the object providing the service. Typically, the request and the provided services are described using semantic descriptions, e.g. relying on concepts from a number of ontologies.

A current centralized technique consists in regrouping all semantic service descriptions and processing the incoming service request, for example, by comparison of their concepts. However, this method is very cost intensive in terms of computational time and memory, and may suffer from a "performance bottleneck" due to its centralized nature.

Another, so-called peer-to-peer, approach can be employed where simple smart spaces (i.e., physical rooms including the objects) are considered. However, this solution requires supplementary intelligence to correctly address location-intensive requests (i.e., requests for several services being hosted in several different rooms).

According to the foregoing, there exists a need for improved service discovery in the context of interconnected smart spaces hosting a vast number of available objects and their associated services. An efficient and fast service discovery mechanism making economical use of computational and memory resources is highly desirable.

SUMMARY OF EXEMPLARY EMBODIMENTS

Embodiments of the present invention provide an improved method and an improved system for enabling the discovery of at least one service associated with an object located in a space among interconnected smart spaces, wherein the method and the system resolve the above mentioned problems.

According to a first aspect, there is provided a method for enabling the discovery of at least one service matching a discovery request and provided by an object located in a space among interconnected smart spaces, the method comprising:

modelling said interconnected smart spaces in an n-level architecture of parent and child nodes, wherein lowest-level nodes are child nodes representative of spaces containing physical connected objects while nodes of each upper level are either parent nodes with respect to at least one node of a lower level and/or child nodes with respect to at least one node of a higher level, at each lowest-level node:
a) clustering services associated with said physical connected objects into at least one lowest-level service cluster,
b) aggregating parameters defining each lowest-level service cluster in the node into information aggregation,
c) building a service matching table based on said information aggregation and associated services, and
d) sending said information aggregation to parent nodes, at each node from level 2 to n:
e) clustering received information aggregation into at least one upper-level cluster,
f) aggregating parameters defining each upper-level cluster in the node into local information aggregation,
g) building a cluster matching table based on said local information aggregation and said received information aggregation, and
h) sending said local information aggregation to parent nodes, if any, wherein steps e) to h) are performed recursively within each node starting from level 2 and wherein upon reception, at a processing node among the parent nodes, of the discovery request for a service, processing said request to forward it level by level to child nodes upon successive matching of the request with the cluster matching table until the request reaches a target lowest-level node representative of a space containing the object providing the service matching the request.

Advantageously, the processing step may comprise:
i) comparing the received discovery request with the local information aggregation of the processing node,
j) in case of matching, forwarding the request to a child node using the cluster matching table of the processing node,
k) in case of no matching, forwarding the request to a parent node, wherein steps i) to k) are performed recursively until the request reaches the target lowest-level node or a highest-level node.

In some embodiments, step i) may comprise:
matching the request with the local information aggregation using a first decision threshold, and
matching the request with the received information aggregation using a second decision threshold.

Any of the above methods may further include, at the target lowest-level node, the step of matching the request with the associated services using a third decision threshold.

Any of the above methods, wherein the request may include a location constraint indicating a requested space among the interconnected smart spaces, may further comprise routing the request to the node representing the requested space.

Preferably, upon reception of a discovery request for a service at a lowest-level node, the method further comprises:
  comparing the request with the information aggregation of the lowest-level node, and
  in case of no matching, forwarding the request to a parent node.

According to a second aspect, there is provided a system for enabling the discovery of at least one service matching a discovery request and provided by an object located in a space among interconnected smart spaces, the system comprising an n-level architecture of parent and child nodes, wherein lowest-level nodes are child nodes representative of spaces containing physical connected objects while nodes of each upper level are either parent nodes with respect to at least one node of a lower level and/or child nodes with respect to at least one node of a higher level, wherein:
  each lowest-level node comprises:
    means for clustering services associated with said physical connected objects into at least one lowest-level service cluster,
    means for aggregating parameters defining each lowest-level service cluster in the node into information aggregation,
    means for building a service matching table based on said information aggregation and associated services, and
    means for sending said information aggregation to parent nodes,
  each node from level 2 to n comprises:
    means for clustering received information aggregation into at least one upper-level cluster,
    means for aggregating parameters defining each upper-level cluster in the node into local information aggregation,
    means for building a cluster matching table based on said local information aggregation and said received information aggregation, and
    means for sending said local information aggregation to parent nodes, if any, and
  a processing node among the parent nodes comprises processing means for processing, upon reception, the discovery request for a service to forward it level by level to child nodes upon successive matching of the request with the cluster matching table until the request reaches a target lowest-level node representative of a space containing the object providing the service matching the request.

Additional aspects and advantages of methods and systems according to embodiments disclosed herein will be set forth, in part, in the detailed description, figures and any claims which follow, and in part will be derived from the detailed description. It is to be understood that both the foregoing general description and the following detailed description are only exemplary and do not limit the claimed inventions.

BRIEF DESCRIPTION OF THE DRAWING

Exemplary embodiments of methods and systems are described with reference to the accompanying drawing, in which:

FIG. 1 schematically represents an example of interconnected smart spaces in a 3-level architecture of parent and child nodes, and associated service clusters and upper-level clusters, obtained according to steps of embodiments of the method of the present disclosure.

DETAILED DESCRIPTION

The figure and the following description illustrate exemplary embodiments. Embodiments of the present disclosure provide a method for enabling the discovery of at least one service matching a discovery request and provided by an object located in a space among interconnected smart spaces. The method is illustrated with reference to FIG. 1 and comprises the following steps.

In a first step, the interconnected smart spaces are modelled in an n-level architecture 1 of parent and child nodes 2-4 (level $\beta=1\ldots n$). Lowest-level nodes 2 are child nodes representative of spaces containing physical connected objects and their associated services. The objects may be connected to a communication network, such as the internet, via communication terminals and wired or wireless connection means. Nodes 3, 4 of each upper level are either parent nodes with respect to at least one node of a lower level, child nodes with respect to at least one node of a higher level, or both child and parent nodes. The architecture 1 of nodes may typically be used to mirror a distribution of physical spaces. As such, the n-level architecture 1 of nodes represents a graph, wherein each node 2-4 represents a smart space. For example, lowest-level nodes 2 may correspond to simple smart spaces that physically contain objects and logically host their services in form of service descriptions 24. Typically, the provided services are described with semantic concepts from different ontologies being linked to different knowledge domains.

Upper-level nodes 3, 4 may correspond to complex smart spaces that include other smart spaces. The edges 11 are directed edges connecting parent nodes to their child nodes.

In a second step, at each lowest-level node 2, services 24 associated with said physical connected objects are clustered into at least one lowest-level service cluster 22. The clustering may be performed using semantic service descriptions of the services. Any clustering technique may be used. For example, a hierarchical agglomerative clustering technique may be used, wherein for each pair of services, a similarity distance value is calculated so as to regroup similar services. Clusters are obtained according to a desired dissimilarity level, i.e., a clustering threshold. For example, the similarity distance may be representative of the similarity of the concepts of the semantic descriptions of the services.

In a third step, at each lowest-level node 2, parameters 26, 28 defining each lowest-level service cluster 22 in the node 2 are aggregated into information aggregation. The information aggregation may be considered as the extraction of information from a cluster and gives a synopsis of the whole content of that cluster. The parameters 26, 28 may include a representative 26 of the cluster 22 and a radius 28 of the cluster 22, whereby the radius 28 is the maximum similarity distance value between all services of the cluster 22 and the representative 26, and the representative 26 may be considered the centre of the cluster 22. The representative 26 of a lowest-level cluster 22 may be one of the clustered service descriptions 24 that represents the remaining service descriptions of that cluster 22.

In a fourth step, at each lowest-level node 2, a service matching table is built based on the information aggregation 26, 28 and associated clustered services 24. For example, the service matching table may list, for each cluster 22 of the considered node 2, the representative 26 and associated radius 28 as well as the clustered services. The service matching table is stored in the node 2.

In a fifth step, at each lowest-level node 2, the information aggregation 26, 28 is sent to parent nodes, as illustrated by arrows 5 between lowest-level nodes 2 and the upper-level node 3 ($\beta=2$) in FIG. 1.

In a sixth step, at each upper-level node 3, 4 from level 2 to n, the received information aggregation is clustered into at least one upper-level cluster 32, 42, in a manner similar to that noted with respect to the second step performed in the lowest-level nodes.

In a seventh step, at each upper-level node 3, 4, from level 2 to n, parameters 36, 38 defining each upper-level cluster 32, 42 in the node 3, 4 are aggregated into local information aggregation. Similarly as with respect to the lowest-level nodes 2, the parameters 36, 38 may include a representative 36 of the cluster 32 and a radius 38 of the cluster 32. Thus, for example, the upper-level clusters 32 of level $\beta=2$ contain the representatives received from the lowest-level clusters 22, and not all of the service descriptions contained in the lowest-level clusters 22. With reference to FIG. 1, the representative 26 of the lowest-level cluster 22 is a clustered element 34 of the upper-level cluster 32.

In an eighth step, at each upper-level node 3, 4 from level 2 to n, a cluster matching table is built based on said local information aggregation and said received information aggregation. The matching table is stored in the node. For example, the cluster matching table may list, for each cluster 32 of a considered node 3 of level $\beta=2$, the representative 36 and associated radius 36 as well as the clustered received representatives 34 from the lowest-level clusters 22.

Each received representative 34 of a cluster may be linked to the node of its origin (i.e., the node hosting that cluster) through a forwarding table. The node of origin may be identified by its level $\beta$, a serial number and/or its location, for example, within a building. The forwarding table may be part of the cluster matching table, or may be a separate table. In the latter case, the separate forwarding table is preferably also stored in the node.

In a ninth step, at each upper-level node 3, 4, the local information aggregation is sent to parent nodes, if any, as illustrated by arrow 50 between upper-level node 3 ($\beta=2$) and upper-level node 4 ($\beta=3$) in FIG. 1.

In the method according to the present disclosure, the sixth to ninth steps are performed recursively within each upper-level node starting from level 2. Thus, in each upper-level node ($\beta>1$), clustering and information aggregation are performed based on the result of information aggregation of the at least one child node, i.e., based on the received information aggregation. This allows the parent nodes to have a succinct view of the content of their child node(s) without containing the information (service descriptions, received information aggregation) themselves, and thus to facilitate the request forwarding.

In the method according to the present disclosure, upon reception at a processing node among the parent nodes 3, 4 of the discovery request for a service 24, the request is processed in order to be forwarded level by level to child nodes upon successive matching of the request with the cluster matching table until the request reaches a target lowest-level node 2. The target lowest-level node 2 is representative of a space, among the interconnected smart spaces, that contains the object providing the service 24 matching the request.

The discovery request is described using semantic concepts in the same way as the services. The matching (or not) of a request with a service may be based on the similarity of their semantic concepts.

In some embodiments, the processing step comprises comparing the received discovery request with the local information aggregation of the processing node, and, in case of matching, forwarding the request to a child node using the cluster matching table of the processing node. In case of no matching, the request may be forwarded to a parent node. These steps are performed recursively until the request reaches the target lowest-level node 2, i.e., the lowest-level node that contains the object providing the requested service 24 (i.e., a service matching the request), or a highest-level node 4. If, in the highest-level node, no matching is obtained between the request and the local information aggregation of that node, the request is cancelled since the requested service cannot be found in the underlying hierarchy.

In some embodiments, if a discovery request for a service is received at a lowest-level node 2, the method further comprises comparing the request with the information aggregation of the lowest-level node 2, and in case of no matching, forwarding the request to a parent node 3, 4. In the parent node, the request is then compared to the local information aggregation in order to possibly discover another lowest-level node hosting a service description matching the request, if any.

In some embodiments, the step of comparing the received discovery request with the local information aggregation of the processing node comprises matching the request with the local information aggregation using a first decision threshold, and matching the request with the received information aggregation using a second decision threshold. Each cluster in each of the nodes has an associated decision threshold.

The first decision threshold $Td_{K,N}$ of a cluster K may be linked to the radius $r_{K,N}$ of the cluster K in the processing node N (of level $\beta$). For example, the first decision threshold $Td_{K,N}$ may be written as $$Td_{K,N} = r_{K,N} + \theta, \quad (1)$$

wherein $\theta$ is a degree of imprecision that one is ready to accept. For example, if the request reads "Find a colour printer", a representative of a cluster labelled "black-and-white printers" may lead to a positive match since a colour printer may also be represented as it is normally able to provide black-and-white printouts. The first decision threshold $Td_{K,N}$ enables to figure out if that cluster K has a representative (local information aggregation) that may indicate that the cluster contains a service matching the request (for example, the colour printer providing its printing service).

In detail, the matching may be performed using a matching function Q that measures the similarity distance between the request (R) and the representative ($W_{K,N}$) of a cluster K in node N. In the case of matching between a request and a representative, the value of the matching function Q is equal to or smaller than the first decision threshold, $Q(R, W_{K,N}) \leq Td_{K,N}$. Otherwise, there is no matching.

The second decision threshold enables to figure out which of the represented received information aggregation of cluster K contains the requested service (or a representative thereof, depending on the node level $\beta$), i.e., which of the child nodes N' (of level $\beta-1$) contains a cluster K' including the requested service (or a representative thereof). The second decision threshold $Td_{K',N'}$ is associated with a cluster K' in a child node N' of processing node N and may be linked to the radius $r_{K',N'}$ of the cluster K' as shown in equation (1).

By means of the cluster matching table (linking the matching local information aggregation of cluster K and a list of corresponding received information aggregation(s)) of the processing node N and the second decision threshold $Td_{K',N'}$, the request is compared, using the matching function, to each received information aggregation represented by the local information aggregation found using the first decision threshold $Td_{K,N}$. In case of matching, the request is routed to the child node N' hosting the matching received information aggregation, for example using the forwarding table of cluster K of the processing node N.

Once the request is received in the child node N', it is matched against the received information aggregation of a cluster K' of that node N', using the second decision threshold as described above.

Advantageously, the method according to embodiments disclosed herein may further comprise, at the target lowest-level node 2, matching the request (R) with the associated services (S) using a third decision threshold. Thus, once the request has been routed to the target lowest-level node as described above, it is compared to each of the clustered service descriptions of the identified cluster to find services matching the request. Preferably, in this step, the degree of imprecision is zero, $\theta=0$, i.e., in cases where services matching exactly the request are required. Thus, for matching, the value of the matching function Q must be smaller than or equal to the radius $r_{K,N}$ of the considered cluster K in lowest-level node N, $Q(R, S) \leq r_{K,N}$. For example, the request "Find a colour printer" only leads to a result if a colour printer is actually available in the space represented by the target lowest-level node 2.

The matching service description is appended to an answer to be sent back to the requesting user. It is also possible that a plurality of services 24 within a service cluster 22 or a lowest-level node 2 match the request. Then, several or all of the plurality of services may be appended to the answer. Finally, several services hosted by different lowest-level nodes 2 may match the request.

In some embodiments, the request may comprise a location constraint indicating a requested space among the interconnected smart spaces, and the method according to the present disclosure further comprises routing the request to the node 2, 3, 4 representing the requested space. For example, if the request reads "Find a colour printer in the meeting room" and the meeting room is represented by a lowest-level node ($\beta=1$), then the request is routed directly to that lowest-level node in order to search for the printer. Similarly, if the request reads "Find a colour printer on the first floor", with "the first floor" being mapped to a node of level $\beta=2$, then the request is directly forwarded to that upper-level node.

If the request comprises a location constraint and no matching is found when comparing the received discovery request with the local information aggregation of the node being addressed, then the request may be cancelled.

If the request does not comprise a location constraint, then the request is processed according to the method of the present disclosure by the node which receives the request first.

Some embodiments of the present disclosure also provide a system for enabling the discovery of at least one service 24 matching a discovery request and provided by an object located in a space among interconnected smart spaces. The system comprises means for performing the method according to embodiments described hereinabove. Again referring to FIG. 1, the system comprises an n-level architecture 1 of parent and child nodes 2, 3, 4, wherein lowest-level nodes 2 are child nodes representative of spaces that contain physical connected objects while nodes 3, 4 of each upper level are either parent nodes with respect to at least one node of a lower level and/or child nodes with respect to at least one node of a higher level. Each lowest-level node 2 comprises means for clustering services 24 associated with said physical connected objects into at least one lowest-level service cluster 22, means for aggregating parameters 26, 28 defining each lowest-level service cluster 22 in the node 2 into information aggregation, means for building a service matching table based on said information aggregation and associated services 24, and means for sending said information aggregation to parent nodes. Each upper-level node 3, 4 ($\beta=2 \ldots n$) comprises means for clustering received information aggregation into at least one upper-level cluster 32, 42, means for aggregating parameters 36, 38 defining each upper-level cluster 32, 42 in the node 3, 4 into local information aggregation, means for building a cluster matching table based on said local information aggregation and said received information aggregation, and means for sending said local information aggregation to parent nodes, if any. The system further includes, at a processing node among the parent nodes 3, 4, processing means for processing, upon reception, the discovery request for a service to forward it level by level to child nodes upon successive matching of the request with the cluster matching table until the request reaches a lowest-level node 2 representative of a space that contains the object providing the service 24 matching the request.

The method and system according to embodiments disclosed herein provides a number of advantages, some of which are noted in the following.

The method and system according to the present disclosure rely on a physical and logical hierarchical topology of nodes, and thus, on location-driven distribution of services and information aggregation. Each upper-level node ($\beta>1$) in the n-level architecture of nodes clusters and aggregates the received information aggregation from its child node(s). Incoming requests can thus be processed efficiently since they are only compared to a small number of service descriptions or representatives. Costs in terms of computing time and memory space can thus be advantageously reduced, and the resolution of the service discovery requests is significantly simplified.

A person skilled in the art would readily recognize that steps of embodiments of the above-described method can be performed by programmed computers, and in particular a system of distributed computers and/or servers. Herein, some embodiments are intended to cover program storage devices, e.g., digital data storage media, which are machine-executable and encode machine-executable or computer-executable programs of instructions where said instructions perform some or all of the steps of methods described herein. The program storage devices may be, e.g., digital memories, magnetic storage media such as magnetic discs or tapes, hard drives, or optically readable digital storage media. The embodiments are also intended to cover computers programmed to perform said steps of methods described herein.

Although some embodiments of the present invention have been illustrated in the accompanying drawing and described in the foregoing detailed description, it should be understood that the present invention is not limited to the disclosed embodiments, but is capable of numerous rearrangements, modifications and substitutions without departing from the invention as set forth and defined by the following claims.

The invention claimed is:

1. A method for enabling the discovery of at least one service matching a discovery request and provided by an object located in a space among interconnected smart spaces, the method comprising:
modelling said interconnected smart spaces in an n-level architecture of parent and child nodes, wherein lowest-level nodes are child nodes representative of spaces containing physical connected objects while nodes of upper levels are either parent nodes with respect to at least one node of a lower level and/or child nodes with respect to at least one node of a higher level,
at at least one lowest-level node:
clustering services associated with said physical connected objects into at least one lowest-level service cluster,
aggregating parameters defining lowest-level service clusters in the node into information aggregation,
building a service matching table based on said information aggregation and associated services, and
sending said information aggregation to parent nodes,
at at least one node from level 2 to n:
clustering received information aggregation of aggregated parameters defining service clusters of services into at least one upper level cluster,
aggregating parameters defining each upper level cluster in the node into local information aggregation,
building a cluster matching table based on said local information aggregation and said received information aggregation, and
sending said local information aggregation to parent nodes, if any,
wherein the clustering, aggregating, building and sending of each node from level 2 to n are performed recursively within each node starting from level 2, and
wherein upon reception, at a processing node among the parent nodes, of the discovery request for a service, processing said request to forward it level by level to child nodes upon successive matching of the request with the cluster matching table until the request reaches a target lowest-level node representative of a space containing the object providing the service matching the request.

2. The method according to claim 1, wherein the processing comprises:
comparing the received discovery request with the local information aggregation of the processing node,
in case of matching, forwarding the request to a child node using the cluster matching table of the processing node,
in case of no matching, forwarding the request to a parent node, wherein the comparing, forwarding in case of matching and forwarding in case of no matching are performed recursively until the request reaches the target lowest-level node or a highest-level node.

3. The method according to claim 2, wherein comparing comprises:
matching the request with the local information aggregation using a first decision threshold, and
matching the request with the received information aggregation using a second decision threshold.

4. The method according to claim 1, further comprising, at the target lowest-level node:
matching the request with the associated services using a third decision threshold.

5. The method according to claim 1, wherein the request comprises a location constraint indicating a requested space among the interconnected smart spaces, the method further comprising routing the request to the node representing the requested space.

6. The method according to claim 1, wherein upon reception of a discovery request for a service at a lowest-level node, the method further comprises:
comparing the request with the information aggregation of the lowest- level node, and
in case of no matching, forwarding the request to a parent node.

7. A system for enabling the discovery of at least one service matching a discovery request and provided by an object located in a space among interconnected smart spaces, the system comprising an n-level architecture of parent and child nodes, wherein lowest-level nodes are child nodes representative of spaces containing physical connected objects while nodes of each upper level are either parent nodes with respect to at least one node of a lower level and/or child nodes with respect to at least one node of a higher level, wherein:
nodes of the lowest-level comprise:
a lower-level node computer configured to:
cluster services associated with said physical connected objects into at least one lowest-level service cluster,
aggregate parameters defining each lowest-level service cluster in the node into information aggregation,
build a service matching table based on said information aggregation and associated services, and
send said information aggregation to parent nodes,
nodes of level 2 to n comprise:
a higher level node computer configured to:
cluster received information aggregation of aggregated parameters defining service clusters of services into at least one upper-level cluster,
aggregate parameters defining each upper-level cluster in the node into local information aggregation,
build a cluster matching table based on said local information aggregation and said received information aggregation, and
send said local information aggregation to parent nodes, if any, and
a processing node among the parent nodes comprising a processor configured to, upon reception, forward the discovery request for a service level by level to child nodes upon successive matching of the request with the cluster matching table until the request reaches a target lowest-level node representative of a space containing the object providing the service matching the request.

8. A node computer operable in a system comprising an n-level architecture of parent and child nodes, wherein lowest-level nodes are child nodes representative of spaces containing physical connected objects while nodes of each upper level are either parent nodes with respect to at least one node of a lower level and/or child nodes with respect to at least one node of a higher level, the lower-level node computer being configured to:
at least one of: cluster services associated with said physical connected objects into at least one lowest-level service cluster, if configured as a lowest-level node or cluster received information aggregation of aggregated parameters defining lowest-level service clusters of services associated with said physical connected objects into at least one upper-level cluster;

at least one of: aggregate parameters defining each lowest-level service cluster in the node into information aggregation, if configured as a lowest-level node or aggregate parameters defining each upper-level cluster in the node into local information aggregation;

at least one of: build a service matching table based on said information aggregation and associated services, if configured as a lowest-level node or build a cluster matching table based on said local information aggregation and said received information aggregation; and send said information aggregation to parent nodes, if any.

9. The node computer of claim 8, not configured as a lowest-level node and further configured to, upon reception, forward a discovery request for a service level by level to child nodes upon successive matching of the request with the cluster matching table until the request reaches a target lowest-level node representative of a space containing the object providing the service matching the request.

* * * * *